US012697860B2

(12) United States Patent
Yoshida et al.

(10) Patent No.: US 12,697,860 B2
(45) Date of Patent: Aug. 4, 2026

(54) DOOR APPARATUS OF RAILCAR

(71) Applicant: Kawasaki Railcar Manufacturing Co., Ltd., Kobe (JP)

(72) Inventors: Naohiro Yoshida, Kobe (JP); Tatsuya Ikeda, Kobe (JP)

(73) Assignee: KAWASAKI RAILCAR MANUFACTURING CO., LTD., Kobe (JP)

( * ) Notice: Subject to any disclaimer, the term of this patent is extended or adjusted under 35 U.S.C. 154(b) by 0 days.

(21) Appl. No.: 18/854,972

(22) PCT Filed: Apr. 8, 2022

(86) PCT No.: PCT/JP2022/017346
§ 371 (c)(1),
(2) Date: Oct. 8, 2024

(87) PCT Pub. No.: WO2023/195151
PCT Pub. Date: Oct. 12, 2023

(65) Prior Publication Data
US 2025/0249736 A1      Aug. 7, 2025

(51) Int. Cl.
| | |
|---|---|
| *B60J 10/40* | (2016.01) |
| *B60J 10/86* | (2016.01) |
| *B61D 19/00* | (2006.01) |
| *B61D 19/02* | (2006.01) |

(52) U.S. Cl.
CPC .............. B60J 10/40 (2016.02); B60J 10/86 (2016.02); B61D 19/005 (2013.01); B61D 19/026 (2013.01); *E05Y 2900/51* (2013.01)

(58) Field of Classification Search
CPC .. B60J 10/40; B60J 10/86; B60J 10/80; E05F 15/42; E05F 15/44; B61D 19/026; B61D 19/005
See application file for complete search history.

(56) References Cited

U.S. PATENT DOCUMENTS

| | | | | | |
|---|---|---|---|---|---|
| 3,461,611 | A | * | 8/1969 | Axe | ...................... E06B 7/2312 |
| | | | | | 49/498.1 |
| 4,133,365 | A | | 1/1979 | Schleicher | |
| 5,433,031 | A | * | 7/1995 | Dailey | .................... E05F 15/40 |
| | | | | | 49/27 |
| 7,603,813 | B2 | * | 10/2009 | Hackl | ...................... E05F 15/42 |
| | | | | | 49/27 |

(Continued)

FOREIGN PATENT DOCUMENTS

| | | |
|---|---|---|
| CN | 108179966 A | 6/2018 |
| JP | 2006-273008 A | 10/2006 |
| JP | 5759635 B2 | 8/2015 |

*Primary Examiner* — Justin B Rephann
(74) *Attorney, Agent, or Firm* — XSENSUS LLP

(57) ABSTRACT

When a side sliding door is in a fully closed state, there is a space between a first elastic structure and a second elastic structure, and a first projecting wall portion and a second projecting wall portion are located so as to overlap each other when viewed in a thickness direction of the side sliding door. An elastic fin includes: an attaching portion detachably attached to one of the first elastic structure or the second elastic structure; and a fin portion projecting from the attaching portion. When the side sliding door is in the fully closed state, the fin portion contacts the other of the first elastic structure or the second elastic structure.

9 Claims, 5 Drawing Sheets

(56)     References Cited

U.S. PATENT DOCUMENTS

| | | | |
|---|---|---|---|
| 8,061,084 B2 * | 11/2011 | Katzensteiner | B60J 10/40 |
| | | | 49/27 |
| 8,881,464 B1 * | 11/2014 | Huckeba | E06B 1/6046 |
| | | | 49/489.1 |
| 9,302,684 B2 * | 4/2016 | Kawashima | B61D 19/026 |
| 9,849,767 B2 * | 12/2017 | Salles | B60J 10/40 |
| 10,569,627 B2 * | 2/2020 | Baba | B60J 10/277 |
| 10,844,645 B2 * | 11/2020 | Hirtenlehner | E05F 15/44 |
| 11,261,643 B2 * | 3/2022 | Kawase | E05F 15/42 |
| 11,549,301 B2 * | 1/2023 | Kawase | E05F 15/44 |
| 11,834,886 B2 * | 12/2023 | Hirtenlehner | B60J 5/062 |
| 2009/0026709 A1 * | 1/2009 | Katzensteiner | B60J 10/40 |
| | | | 277/321 |
| 2009/0045649 A1 * | 2/2009 | Eungard | B60J 10/00 |
| | | | 296/186.4 |
| 2011/0011004 A1 * | 1/2011 | Courrian | B61D 19/026 |
| | | | 49/483.1 |
| 2015/0007745 A1 | 1/2015 | Kawashima et al. | |
| 2016/0137043 A1 * | 5/2016 | Baba | B60J 10/277 |
| | | | 49/483.1 |
| 2020/0291709 A1 * | 9/2020 | Hirtenlehner | B60J 5/0495 |
| 2022/0048372 A1 * | 2/2022 | Bramauer | E05F 15/44 |
| 2024/0191553 A1 * | 6/2024 | Jetzinger | B61D 19/005 |

* cited by examiner

VERTICAL DIRECTION

VERTICAL DIRECTION

DOOR APPARATUS OF RAILCAR

CROSS-REFERENCE TO RELATED APPLICATION

The present application is based on PCT filing PCT/JP2022/017346, filed Apr. 8, 2022, the entire contents of each are incorporated herein by reference.

TECHNICAL FIELD

The present disclosure relates to a door apparatus of a railcar.

BACKGROUND ART

To prevent water from entering into a railcar from an outside or to prevent clothes of passengers and the like from being caught in a door, a door stop rubber is attached to a tip of a side sliding door that opens and closes a door opening portion of a side bodyshell of the railcar. As the door stop rubber, there are a non-contact door stop rubber and a contact door stop rubber.

PTL 1 discloses a side sliding door including a pair of non-contact door stop rubbers (elastic structures). When this side sliding door is in a door fully closed state, the pair of door stop rubbers are fitted to each other without contacting each other.

CITATION LIST

Patent Literature

PTL 1: Japanese Patent No. 5759635

SUMMARY OF INVENTION

Technical Problem

However, according to the non-contact door stop rubbers, there is a space between the door stop rubbers. Therefore, wind may flow through the space, and sound outside the railcar may enter into the railcar through the space. Therefore, there is still room for improvement in terms of soundproofing.

An object of one aspect of the present disclosure is to improve a door apparatus including a non-contact door stop rubber to improve a soundproof property of the door apparatus.

Solution to Problem

A door apparatus of a railcar according to one aspect of the present disclosure includes: a side sliding door that opens and closes a door opening of a side bodyshell of the railcar; a first elastic structure attached to a door end of the side sliding door in a vertical direction; a second elastic structure that is opposed to the first elastic structure in a non-contact state when the side sliding door is in a fully closed state; and an elastic fin separable from the first elastic structure and the second elastic structure. The first elastic structure includes a first base portion and a first projecting wall portion projecting from the first base portion toward the second elastic structure. The second elastic structure includes a second base portion and a second projecting wall portion projecting from the second base portion toward the first elastic structure. When the side sliding door is in the fully closed state, there is a space between the first elastic structure and the second elastic structure, and the first projecting wall portion and the second projecting wall portion are located so as to overlap each other when viewed in a thickness direction of the side sliding door. The elastic fin includes: an attaching portion detachably attached to one of the first elastic structure or the second elastic structure; and a fin portion projecting from the attaching portion. When the side sliding door is in the fully closed state, the fin portion contacts the other of the first elastic structure or the second elastic structure.

Advantageous Effects of Invention

According to one aspect of the present disclosure, when the side sliding door is in the fully closed state, a route between a car outside and a car inside in the space is blocked by the elastic fin. Therefore, when the elastic fin is included in the door apparatus in which the first elastic structure and the second elastic structure are of a non-contact type, the soundproof property can be improved. In addition, since the elastic fin is detachably attached to the first elastic structure or the second elastic structure, only the elastic fin is replaceable, and this can reduce the maintenance cost.

DESCRIPTION OF EMBODIMENTS

Figure 1:
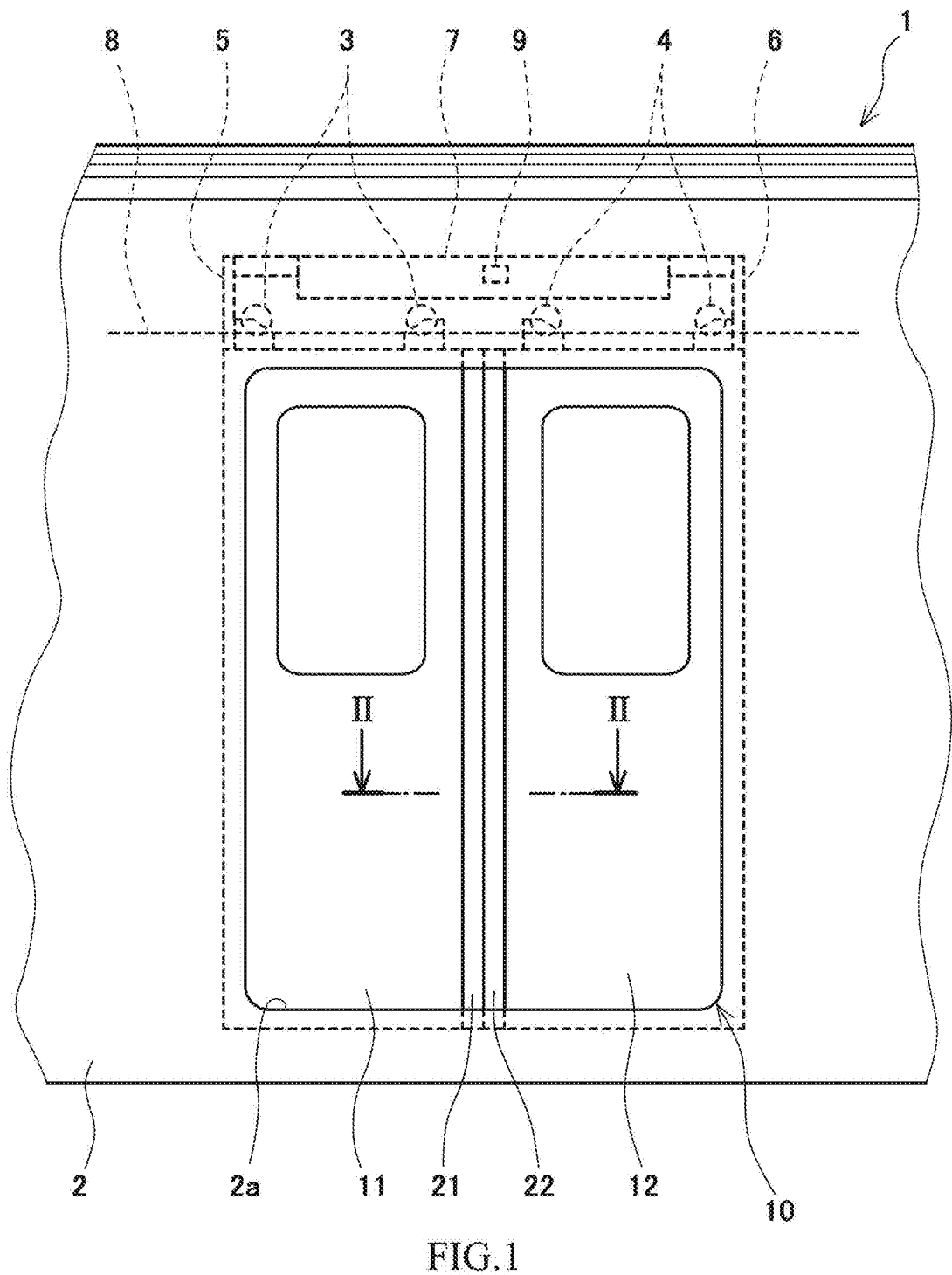
FIG. 1 is a side view showing a door apparatus of a railcar according to an embodiment and its vicinity.

FIG. 1 is a side view showing a door apparatus 10 of a railcar 1 according to an embodiment and its vicinity. As shown in FIG. 1, the railcar 1 includes: a side bodyshell 2 including a door opening 2a; and the door apparatus 10 which is of a double door type and opens and closes the door opening 2a. The door apparatus 10 includes: a first side sliding door 11 and a second side sliding door 12 which approach each other and separate from each other, i.e., slidingly close and open; a first elastic structure 21 and a second elastic structure 22 which are a pair of door stop rubbers attached to respective door ends of the side sliding doors 11 and 12 in a vertical direction; and an elastic fin 40 (shown in FIGS. 2 and 3) detachably attached to the first elastic structure 21.

Pulleys 3 are attached to an upper portion of the first side sliding door 11, and pulleys 4 are attached to an upper portion of the second side sliding door 12. The pulleys 3 and 4 are guided by a guide rail 8 located above the door opening 2a. A door driver 7 that slidingly opens and closes the first and second side sliding doors 11 and 12 is located above the first and second side sliding doors 11 and 12 through brackets 5 and 6. The door driver 7 may be a pneumatic actuator that drives by using compressed air or may be an electric actuator that drives by using a motor. An abnormality detector 9 is located at the door driver 7. The abnormality detector 9 detects catching of a foreign matter from resistance generated when the first and second side sliding doors 11 and 12 close. As the arrangement of the door driver, a guide mechanism of the side sliding door, and the like, there are various types, and they are not limited to the present embodiment.

Figure 2:
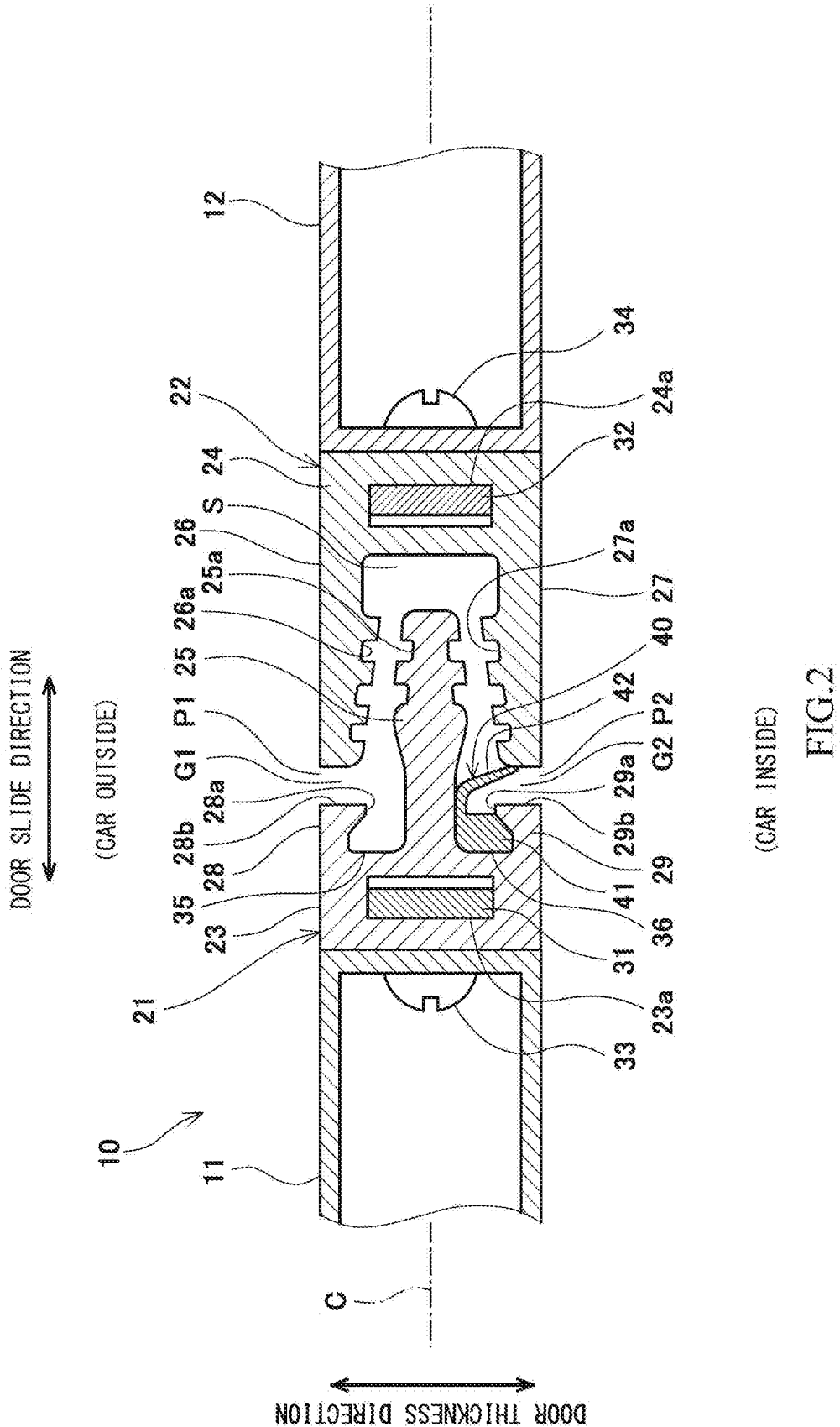
FIG. 2 is a horizontal sectional view taken along line II-II of FIG. 1.
Figure 3:
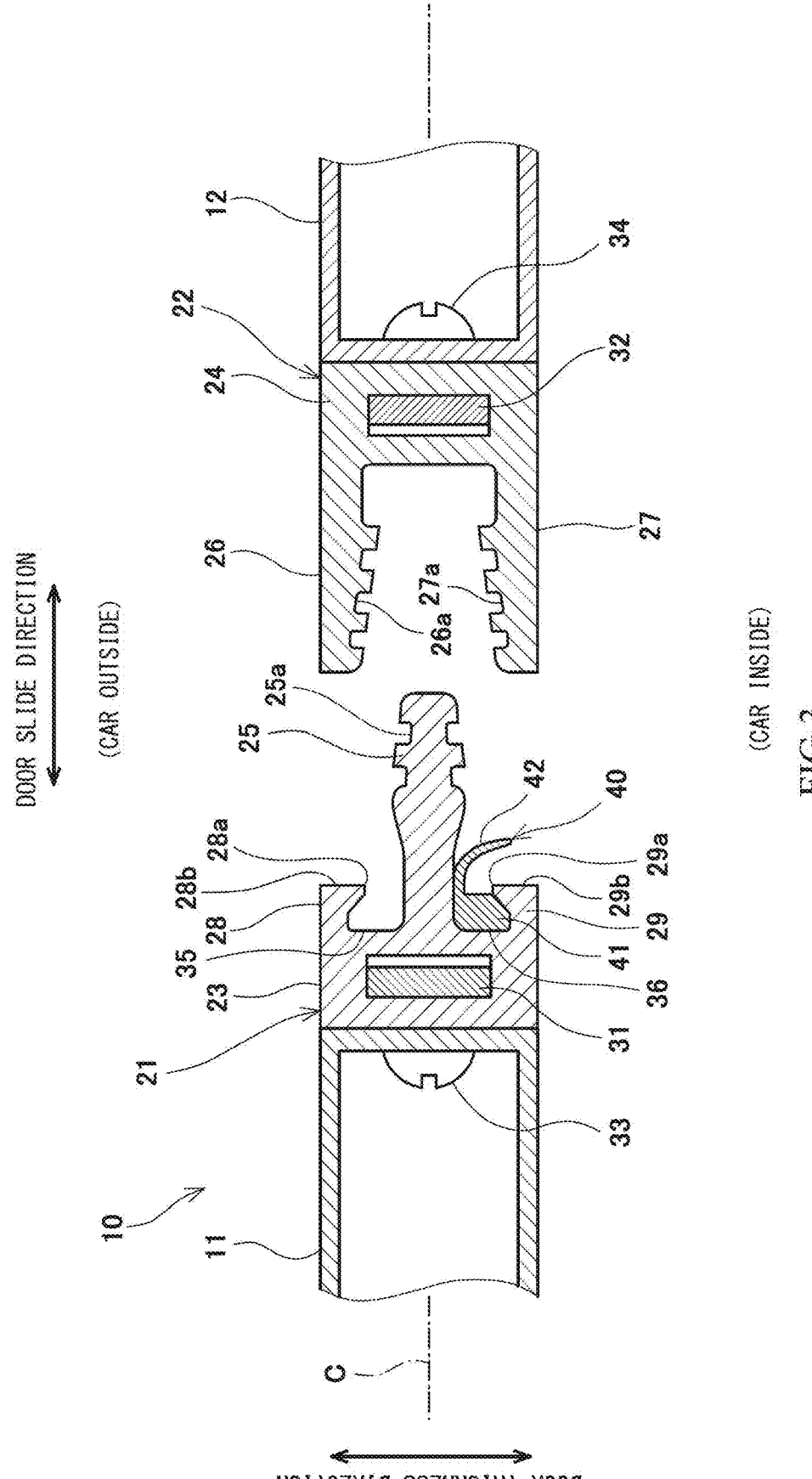
FIG. 3 is a diagram corresponding to FIG. 2 and showing a state immediately before a side sliding door closes.

FIG. 2 is a horizontal sectional view taken along line II-II of FIG. 1. FIG. 3 is a diagram corresponding to FIG. 2 and showing a state immediately before the side sliding doors 11 and 12 close. As shown in FIGS. 2 and 3, the first elastic structure 21 and the second elastic structure 22 are made of rubber and has such a shape as to be symmetrical with respect to a center line C of the side sliding doors 11 and 12 in a door thickness direction. When the first and second side sliding doors 11 and 12 are in a fully closed state, the first elastic structure 21 and the second elastic structure 22 are opposed to each other in a non-contact state. The door thickness direction is the same as a car width direction.

The first elastic structure 21 includes a first base portion 23 and a first projecting wall portion 25. The first base portion 23 is fixed to a tip of the first side sliding door 11. The first projecting wall portion 25 projects in a door slide direction toward the second elastic structure 22 so as to extend on the center line C from a door thickness direction middle portion of the first base portion 23. The second elastic structure 22 includes a second base portion 24, a second projecting wall portion 26, and a third projecting wall portion 27. The second base portion 24 is fixed to a tip of the second side sliding door 12. The second projecting wall portion 26 projects in the door slide direction toward the first elastic structure 21 from one of door thickness direction end portions of the second base portion 24. The third projecting wall portion 27 projects in the door slide direction toward the first elastic structure 21 from the other door thickness direction end portion of the second base portion 24. The door slide direction is the same as a car longitudinal direction.

The first base portion 23 includes a hollow portion 23a extending in the vertical direction, and a metal plate 31 is in the hollow portion 23a. The second base portion 24 includes a hollow portion 24a extending in the vertical direction, and a metal plate 32 is in the hollow portion 24a. Then, the first elastic structure 21 is fixed to the first side sliding door 11 in such a manner that a screw 33 is fixed to the metal plate 31 from an inside of the side sliding door 11 through the base portion 23, and the second elastic structure 22 is fixed to the second side sliding door 12 in such a manner that a screw 34 is fixed to the metal plate 32 from an inside of the side sliding door 12 through the base portion 24. As the method of attaching the elastic structures 21 and 22 to the side sliding doors 11 and 12, there are various methods, and it is not limited to the present embodiment. For example, the elastic structures 21 and 22 may be engaged with the respective side sliding doors 11 and 12.

When the side sliding doors 11 and 12 are set to the fully closed state by the door driver 7 (FIG. 1), there is a space S between the first elastic structure 21 and the second elastic structure 22. When the side sliding doors 11 and 12 are in the fully closed state, the first to third projecting wall portions 25 to 27 are located so as to overlap each other when viewed in the thickness direction of the side sliding doors 11 and 12.

The first projecting wall portion 25 includes grooves 25a on both side surfaces facing the space S. The grooves 25a are depressed in the door thickness direction and extend from an upper end to a lower end in the vertical direction. The second projecting wall portion 26 includes grooves 26a on an inner side surface facing the space S, and the third projecting wall portion 27 includes grooves 27a on an inner side surface facing the space S. The grooves 26a and 27a are depressed in the door thickness direction and extend from an upper end to a lower end in the vertical direction.

Both door thickness direction end portions of the first base portion 23 are opposed to respective tips of the second and third projecting wall portions 26 and 27. The first elastic structure 21 further includes convex portions 28 and 29 that respectively project from both door thickness direction end portions of the first base portion 23 toward the tips of the second and third projecting wall portions 26 and 27. The convex portions 28 and 29 are spaced apart from the first projecting wall portion 25 in the door thickness direction. The amount of projection of each of the convex portions 28 and 29 is smaller than the amount of projection of the first projecting wall portion 25.

The convex portions 28 and 29 extend from the upper end of the first base portion 23 to the lower end of the first base portion 23 in the vertical direction. A tip portion of the convex portion 28 includes a rib 28a projecting in the door thickness direction toward the first projecting wall portion 25, and a tip portion of the convex portion 29 includes a rib 29a projecting in the door thickness direction toward the first projecting wall portion 25. The rib 28a extends from the upper end of the convex portion 28 to the lower end of the convex portion 28 in the vertical direction, and the rib 29a extends from the upper end of the convex portion 29 to the lower end of the convex portion 29 in the vertical direction. The rib 28a projects in a tapered shape toward the first projecting wall portion 25 at the tip portion of the convex portion 28, and the rib 29a projects in a tapered shape toward the first projecting wall portion 25 at the tip portion of the convex portion 29.

The first elastic structure 21 includes: an engaged groove 35 defined by the first base portion 23, the first projecting wall portion 25, and the convex portion 28; and an engaged groove 36 defined by the first base portion 23, the first projecting wall portion 25, and the convex portion 29. Each of the engaged grooves 35 and 36 has such a shape that an entrance thereof is narrow. The engaged groove 35 has such a shape as to narrow toward the second elastic structure 22 in the door slide direction. The engaged groove 35 serves as a fitted portion to which the elastic fin 40 is fitted.

The convex portion 28 of the first elastic structure 21 includes an opposing surface 28b that is opposed to a tip of the second projecting wall portion 26 of the second elastic structure 22 in the door slide direction. The convex portion 29 of the first elastic structure 21 also includes an opposing surface 29b that is opposed to a tip of the third projecting wall portion 27 of the second elastic structure 22 in the door slide direction. When the side sliding doors 11 and 12 are in the fully closed state, there is a gap G1 between the opposing surface 28b of the convex portion 28 of the first elastic structure 21 and the tip of the second projecting wall portion 26 of the second elastic structure 22. When the side sliding doors 11 and 12 are in the fully closed state, there is also a gap G2 between the opposing surface 29b of the convex portion 29 of the first elastic structure 21 and the tip of the third projecting wall portion 27 of the second elastic structure 22.

When the side sliding doors 11 and 12 are in the fully closed state, the space S includes: a car outside opening P1 facing a car outside in the car width direction; and a car inside opening P2 facing a car inside in the car width direction. The car outside opening P1 is an entrance to the space S from the car outside, and the car inside opening P2 is an entrance to the space S from the car inside. In the present embodiment, the gap G1 is the car outside opening P1, and the gap G2 is the car inside opening P2.

The elastic fin 40 is detachably attached to the first elastic structure 21. The elastic fin 40 is separable from the first elastic structure 21 and the second elastic structure 22. The elastic fin 40 extends from the upper end of the space S to the lower end of the space S in the vertical direction. The elastic fin 40 includes an attaching portion 41 and a fin portion 42. The attaching portion 41 is detachably attached to the first elastic structure 21. The fin portion 42 projects from the attaching portion 41. The attaching portion 41 is engaged with the engaged groove 36. The attaching portion 41 tightly contacts an inner surface of the engaged groove 36. Since the engaged groove 36 has such a shape that the entrance thereof is narrow, the attaching portion 41 does not fall off in the door slide direction.

The fin portion 42 projects from the first projecting wall portion 25 toward the car inside in the door thickness direction. The fin portion 42 is opposed to the tip of the third projecting wall portion 27 of the second elastic structure 22. When the side sliding doors 11 and 12 are in the fully closed state, the fin portion 42 is in contact with the tip of the third projecting wall portion 27 of the second elastic structure 22 in the door slide direction and is elastically deformed. Thus, when the side sliding doors 11 and 12 are in the fully closed state, a route between the car outside and the car inside in the space S is blocked by the elastic fin 40.

The elastic fin 40 is located at a downstream region of the route between the car outside and the car inside in the space S. The grooves 25a, 26a, and 27a are located upstream of the elastic fin 40 in the route between the car outside and the car inside in the space S. When the side sliding doors 11 and 12 are in the fully closed state, the fin portion 42 of the elastic fin 40 overlaps the car inside opening P2 when viewed from the car inside in the car width direction. The fin portion 42 is located at the car inside opening P2. The fin portion 42 of the elastic fin 40 is located so as to be visible from the car inside. A contact portion where the fin portion 42 of the elastic fin 40 and the third projecting wall portion 27 of the second elastic structure 22 contact each other is visible from the car inside. When the side sliding doors 11 and 12 are in the fully closed state, the fin portion 42 is located in the gap G2, and the attaching portion 41 is located outside the gap G2.

A material of the elastic fin 40 includes a material which is lower in friction coefficient and more flexible than a material of the first elastic structure 21 and the second elastic structure 22. For example, the first elastic structure 21 and the second elastic structure 22 are made of ethylene propylene diene monomer (EPDM) rubber, and at least the fin portion 42 of the elastic fin 40 is made of a mixture of natural rubber and EPDM rubber. The natural rubber is more flexible than the EPDM rubber. A surface of the elastic fin 40 is made of the EPDM rubber. Therefore, the elastic fin 40 is flexible as a whole and is improved in surface hardness. The material of the elastic fin 40 is not limited to this and may be a different material as long as it is an elastic material.

Figure 4:
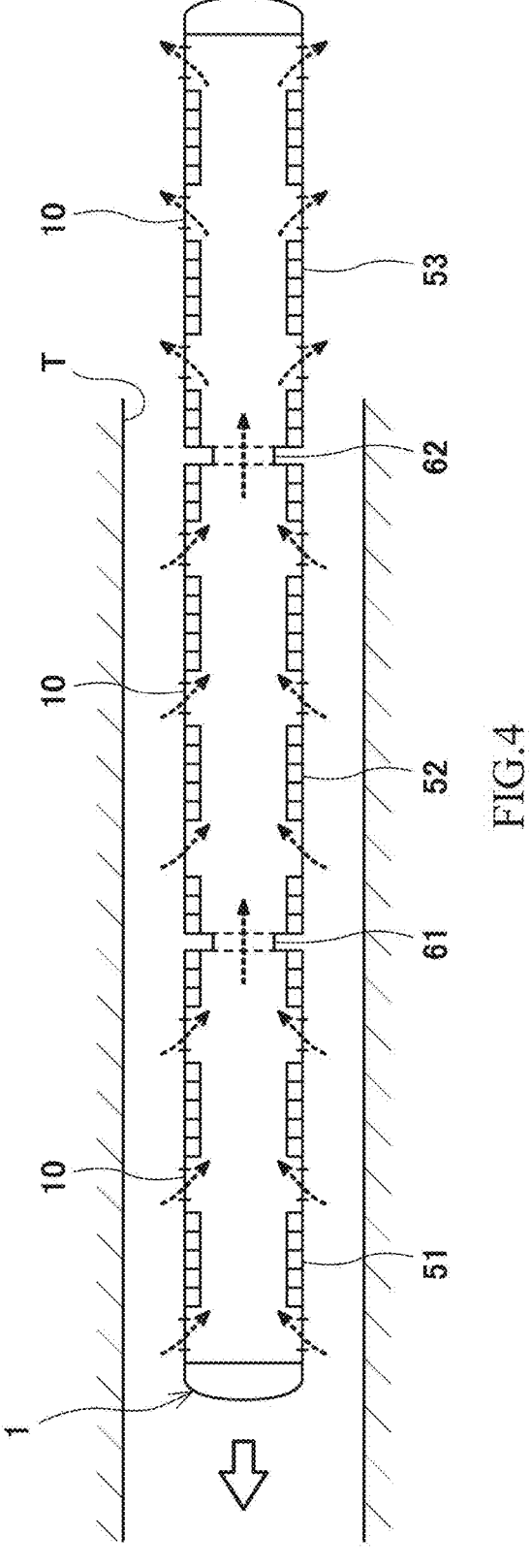
FIG. 4 is a schematic diagram showing the railcar that is passing through a tunnel.

FIG. 4 is a schematic diagram showing the railcar 1 that is passing through a tunnel. As shown in FIG. 4, the railcar 1 is, for example, a train including three cars 51 to 53 or more coupled to each other. The cars 51 to 53 are connected to each other through gangways 61 and 62. Car inner spaces of the cars 51 to 53 communicate with each other through spaces of the gangways 61 and 62. At each of the gangways 61 and 62, there is no door that separates the car inner spaces of the adjacent cars from each other.

If the door stop rubbers of the door apparatus 10 are of a non-contact type, and the car 51 that is a head car of the railcar 1 enters a tunnel T, air enters from the car outside to the car inside of the head car 51 through the space S (see FIG. 2) of the door apparatus 10 of the head car 51, and the entered air flows toward the cars 52 and 53 at a rear side through the gangways 61 and 62. Then, when the car 52 that is a middle car of the railcar 1 enters the tunnel T, air enters from the car outside to the car inside of the middle car 52 through the space S (see FIG. 2) of the door apparatus 10 of the middle car 52, and the entered air flows toward the car 53 at the rear side through the gangway 62.

To be specific, the air flowing from the cars 51 and 52 at the front side are accumulated in the car inside of the car 53 at a rear end, and this increases the pressure of the car inside of the car 53 at the rear end. Therefore, the air is discharged from the car inside of the car 53 at the rear end to the car outside through the space S (see FIG. 2) of the door apparatus 10 of the car 53, and this may generate discharge sound. However, in the present embodiment, the route between the car outside and the car inside in the space S in the door apparatus 10 is blocked by the elastic fin 40. Therefore, the generation of the discharge sound of the air is prevented, and this can improve a soundproof property.

According to the above-described configuration, when the side sliding doors 11 and 12 are in the fully closed state, the route between the car outside and the car inside in the space S is blocked by the elastic fin 40, and this can improve the soundproof property. In addition, since the elastic fin 40 is detachably attached to the first elastic structure 21 or the second elastic structure 22, only the elastic fin 40 is replaceable, and this can reduce the maintenance cost.

The elastic fin 40 is located at the opening P2 of the space S. Therefore, it is easy to visually confirm the state of the elastic fin 40 when the side sliding doors 11 and 12 are in the fully closed state, and this improves the ease of maintenance.

The elastic fin 40 is located at the car inside opening P2. Therefore, water having entered into the space S from the car outside is captured by the grooves 25a, 26a, and 27a. Thus, the application of the water pressure to the elastic fin 40 from the car outside at the time of washing of the car body or the like can be suppressed.

The attaching portion 41 is engaged with the engaged groove 36. Since the elastic fin 40 is attached by an engagement structure, assembling and disassembling can be made easy.

The fin portion 42 contacts the tip of the second elastic structure 22 in the slide direction of the side sliding doors 11 and 12. Therefore, drag of the elastic fin 40 when opening and closing the side sliding doors 11 and 12 can be suppressed.

The fin portion 42 is located at the gap G2, and the attaching portion 41 is located outside the gap G2. Therefore, since a movable range of the fin portion 42 of the elastic fin 40 is not narrowed by the attaching portion 41, the increase in resistance when closing the side sliding doors 11 and 12 can be prevented.

The elastic fin 40 extends from the upper end of the space S to the lower end of the space S in the vertical direction. Therefore, the soundproof property can be improved over the entirety from the upper end of the space S to the lower end of the space S.

The material of the elastic fin 40 includes a material which is lower in friction coefficient and more flexible than the material of the first elastic structure 21 and the second elastic structure 22. Therefore, the resistance generated when pulling out clothes and the like caught between the first elastic structure 21 and the second elastic structure 22 can be reduced.

Figure 5:
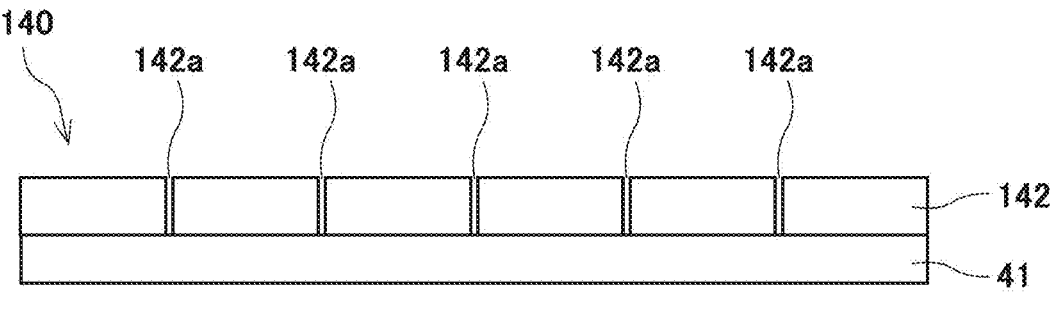
FIG. 5 is a side view showing Modified Example 1 of an elastic fin of FIG. 3.

FIG. 5 is a side view showing Modified Example 1 of the elastic fin 40 of FIG. 3. As shown in FIG. 5, an elastic fin 140 of Modified Example 1 has the same horizontal section as the elastic fin 40 of the above embodiment. To be specific, the elastic fin 140 includes the attaching portion 41 and a fin portion 142. The attaching portion 41 is detachably attached to the first elastic structure 21 (see FIG. 2). The fin portion 142 projects from the attaching portion 41. The fin portion 142 includes slits 142a located at intervals in the vertical direction. The slits 142a extend in the horizontal direction from a horizontal direction tip of the fin portion 142 toward the attaching portion 41. According to this configuration, the resistance generated when pulling out clothes and the like caught between the first elastic structure 21 (see FIG. 2) and the second elastic structure 22 (see FIG. 2) can be reduced.

Figure 6:
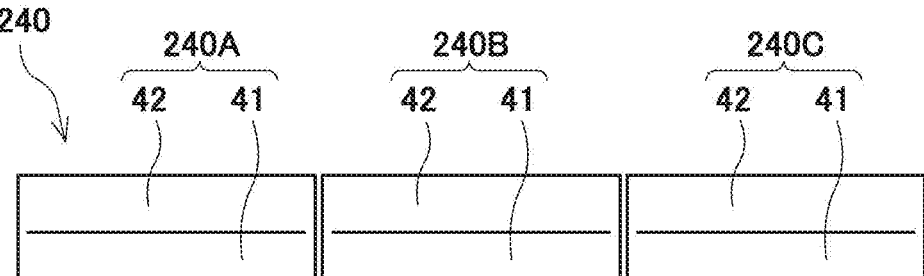
FIG. 6 is a side view showing Modified Example 2 of the elastic fin of FIG. 3.

FIG. 6 is a side view showing Modified Example 2 of the elastic fin 40 of FIG. 3. As shown in FIG. 6, an elastic fin 240 of Modified Example 2 is divided in the vertical direction. To be specific, elastic fins 240A to 240C each of which includes the attaching portion 41 and the fin portion 42 and which are lined up in the vertical direction are included in the elastic fin 240. According to this configuration, the resistance generated when pulling out clothes and the like caught between the first elastic structure 21 (see FIG. 2) and the second elastic structure 22 (see FIG. 2) can be reduced.

Each of the shapes of the first elastic structure 21 and the second elastic structure is merely one example and is not especially limited as long as the shape is of a non-contact type. The above embodiment describes the side sliding doors 11 and 12 of a double door type. However, a side sliding door of a single door type may be adopted. For example, the first elastic structure may be attached to a door end of the side sliding door of a single door type, and the second elastic structure may be attached to the side bodyshell at a position opposed to the first elastic structure when the side sliding door is in the fully closed state.

The attaching portion 41 of the elastic fin 40 is attached to the first elastic structure 21 by the engagement. However, the attaching portion 41 of the elastic fin 40 may be attached to the first elastic structure 21 by a fixture. The elastic fin 40 is located at the car inside opening P2 of the space S when viewed from the car inside in the car width direction. However, the elastic fin 40 may be located at the car outside opening P1 of the space S when viewed from the car outside in the car width direction. To be specific, the elastic fin 40 may be located so as to be engaged with the engaged groove 35. Moreover, the elastic fins 40 may be attached to both of the engaged grooves 35 and 36 of the first elastic structure 21.

The foregoing has described the embodiment as an example of the technology disclosed in the present application. However, the technology in the present disclosure is not limited to this and is applicable to embodiments in which modifications, replacements, additions, omissions, and the like have been suitably made. Moreover, a new embodiment may be prepared by combining the components described in the above embodiment. For example, some of components or methods in one embodiment or one modified example may be applied to another embodiment or another modified example. Some components in an embodiment may be separated from the other components in the embodiment and arbitrarily extracted.

Furthermore, the components shown in the attached drawings and the detailed explanations include not only components essential to solve the problems but also components for exemplifying the above technology and not essential to solve the problems.

The following aspects disclose preferred embodiments.

First Aspect

A door apparatus of a railcar, including:

a side sliding door that opens and closes a door opening of a side bodyshell of the railcar;

a first elastic structure attached to a door end of the side sliding door in a vertical direction;

a second elastic structure that is opposed to the first elastic structure in a non-contact state when the side sliding door is in a fully closed state; and an elastic fin separable from the first elastic structure and the second elastic structure, wherein:

the first elastic structure includes a first base portion and a first projecting wall portion projecting from the first base portion toward the second elastic structure;

the second elastic structure includes a second base portion and a second projecting wall portion projecting from the second base portion toward the first elastic structure;

when the side sliding door is in the fully closed state, there is a space between the first elastic structure and the second elastic structure, and the first projecting wall portion and the second projecting wall portion are located so as to overlap each other when viewed in a thickness direction of the side sliding door;

the elastic fin includes an attaching portion detachably attached to one of the first elastic structure or the second elastic structure and a fin portion projecting from the attaching portion; and when the side sliding door is in the fully closed state, the fin portion of the elastic fin contacts the other of the first elastic structure or the second elastic structure.

Second Aspect

The door apparatus according to the first aspect, wherein:

the space includes an opening that faces a car outside or a car inside in a car width direction; and the elastic fin overlaps the opening when viewed in the car width direction.

Third Aspect

The door apparatus according to the second aspect, wherein:

at least one of an outer surface of the first projecting wall portion or an outer surface of the second projecting wall portion which faces the space includes grooves;

the opening includes a car inside opening that faces the car inside in the car width direction; and the elastic fin is located at the car inside opening when viewed from the car inside in the car width direction.

Fourth Aspect

The door apparatus according to any one of the first to third aspects, wherein:

the one of the first elastic structure or the second elastic structure includes an engaged portion; and

the attaching portion is engaged with the engaged portion to be detachably attached to the one of the first elastic structure or the second elastic structure.

Fifth Aspect

The door apparatus according to any one of the first to fourth aspects, wherein the fin portion contacts a tip of the other of the first elastic structure or the second elastic structure in a slide direction of the side sliding door.

Sixth Aspect

The door apparatus according to any one of the first to fifth aspects, wherein:
    the one of the first elastic structure or the second elastic structure includes an opposing surface that is opposed to a tip of the other of the first elastic structure or the second elastic structure in a slide direction;
    when the side sliding door is in the fully closed state, there is a gap between the opposing surface of the one of the first elastic structure or the second elastic structure and the tip of the other of the first elastic structure or the second elastic structure; and
    the fin portion is located at the gap, and the attaching portion is located outside the gap.

Seventh Aspect

The door apparatus according to any one of the first to sixth aspects, wherein the elastic fin extends from an upper end of the space to a lower end of the space in the vertical direction.

Eighth Aspect

The door apparatus according to any one of the first to seventh aspects, wherein a material of the elastic fin includes a material that is more flexible than a material of the first elastic structure and the second elastic structure.

Ninth Aspect

The door apparatus according to any one of the first to eighth aspects, wherein the fin portion includes a slit that extends in a horizontal direction from a horizontal direction tip of the fin portion.

Tenth Aspect

The door apparatus according to any one of the first to ninth aspects, wherein the elastic fin is divided in the vertical direction.

The invention claimed is:
1. A door apparatus of a railcar, the door apparatus comprising:
    a side sliding door that opens and closes a door opening of a side bodyshell of the railcar;
    a first elastic structure attached to a door end of the side sliding door in a vertical direction;
    a second elastic structure that is opposed to the first elastic structure, the second elastic structure being in a non-contact state with respect to the first elastic structure when the side sliding door is in a fully closed state; and
    an elastic fin separable from the first elastic structure and the second elastic structure, wherein:

the first elastic structure includes a first base and a first projecting wall projecting from the first base toward the second elastic structure;
    the second elastic structure includes a second base and a second projecting wall projecting from the second base toward the first elastic structure;
    the first elastic structure further includes:
        a convex portion projecting from an end portion of the first base in a thickness direction of the side sliding door toward a tip of the second projecting wall while being spaced apart from the first projecting wall in the thickness direction, and
        an engaged groove defined by the first base, the first projecting wall, and the convex portion;
    when the side sliding door is in the fully closed state, there is a space between the first elastic structure and the second elastic structure, and the first projecting wall and the second projecting wall are located so as to overlap each other when viewed in a thickness direction of the side sliding door;
    the elastic fin includes:
        an attaching portion which is detachably attached to the engaged groove, and
        a fin portion projecting from the attaching portion; and
    when the side sliding door is in the fully closed state, the fin portion contacts the second elastic structure.
2. The door apparatus according to claim 1, wherein:
    the space includes an opening that faces one of a car outside and a car inside in a car width direction; and
    the elastic fin overlaps the opening when viewed in the car width direction.
3. The door apparatus according to claim 2, wherein:
    at least one of an outer surface of the first projecting wall and an outer surface of the second projecting wall which faces the space includes grooves;
    the opening includes a car inside opening that faces the car inside in the car width direction; and
    the elastic fin is located at the car inside opening when viewed from the car inside in the car width direction.
4. The door apparatus according to claim 1, wherein the fin portion contacts a tip of the second elastic structure in a slide direction of the side sliding door.
5. The door apparatus according to claim 1, wherein:
    the first elastic structure includes an opposing surface that is opposed to a tip of the second elastic structure in a slide direction;
    when the side sliding door is in the fully closed state, there is a gap between the opposing surface of the one of the first elastic structure and the second elastic structure and the tip of the other of the first elastic structure and the second elastic structure; and
    the fin portion is located at the gap, and the attaching portion is located outside the gap.
6. The door apparatus according to claim 1, wherein the elastic fin extends from an upper end of the space to a lower end of the space in the vertical direction.
7. The door apparatus according to claim 1, wherein a material of the elastic fin includes a material that is lower in friction coefficient and more flexible than a material of the first elastic structure and the second elastic structure.
8. The door apparatus according to claim 1, wherein the fin portion includes a slit that extends in a horizontal direction from a horizontal direction tip of the fin portion.
9. The door apparatus according to claim 1, wherein the elastic fin is divided in the vertical direction.

* * * * *